(12) United States Patent
Januszewski

(10) Patent No.: US 12,019,751 B2
(45) Date of Patent: *Jun. 25, 2024

(54) SUPPRESSION OF SIGNAL TRANSMISSION OVER A CONDUCTOR

(71) Applicant: Lodestone LLC, Anaheim, CA (US)

(72) Inventor: Michael W. Januszewski, Downers Grove, IL (US)

(73) Assignee: Lodestone LLC, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,004

(22) Filed: Aug. 17, 2023

(65) Prior Publication Data

US 2023/0394153 A1    Dec. 7, 2023

Related U.S. Application Data

(63) Continuation of application No. 17/392,688, filed on Aug. 3, 2021, now Pat. No. 11,775,645.

(Continued)

(51) Int. Cl.
*G06F 21/57*       (2013.01)
*H02H 9/00*       (2006.01)

(52) U.S. Cl.
CPC .............. *G06F 21/57* (2013.01); *H02H 9/005* (2013.01); *G06F 2221/034* (2013.01)

(58) Field of Classification Search
CPC ........ H02H 9/005; H02H 9/041; G06F 21/57; G06F 2221/034

(Continued)

(56) References Cited

U.S. PATENT DOCUMENTS 8,223,468 B2    7/2012 Januszewski et al.
2009/0243758 A1*  10/2009 Januszewski ............ H03H 1/00
                                                           333/184

(Continued)

FOREIGN PATENT DOCUMENTS

EP    2230741 A2    9/2010
WO    9937007 A1    7/1999

OTHER PUBLICATIONS

"Data Exfiltration from air gapped systems using power line communication", PushStack, Jul. 24, 2017, https://pushstack.wordpress.com/2017/07/24/data-exfiltration-from-air-gapped-systems-using-power-line-communication/, 14 pages.

(Continued)

*Primary Examiner* — Kevin J Comber
(74) *Attorney, Agent, or Firm* — Lempia Summerfield Katz LLC

(57) ABSTRACT

The disclosed embodiments relate to method and/or device which is effective at cancelling or altering electrical signals or pulses, generated by, for example, digital electronic systems and components, that are induced, reflected or otherwise made present on the mains power supply conductors and/or the earthing or grounding conductor (if present.) The disclosed embodiments cancel these electrical signals thereby providing an effective means of preventing the exfiltration of various data from a computing or similar system by means of power line emissions. The disclosed embodiments may perform this subjugation by: altering the shape of the fundamental current and voltage waveforms and also altering and diminishing any non-fundamental frequency waveforms to a point where they are no longer measurable or detectable; and preventing the communication via inductive coupling of any electrical signals on mains current onto the grounding path or vice versa.

29 Claims, 8 Drawing Sheets

Related U.S. Application Data

(60) Provisional application No. 63/138,007, filed on Jan. 15, 2021.

(58) Field of Classification Search
 USPC .......................................... 361/91.7; 726/22
 See application file for complete search history.

(56) References Cited

U.S. PATENT DOCUMENTS

| | | | | |
|---|---|---|---|---|
| 2014/0036976 A1* | 2/2014 | Shad | ...................... | H04B 3/542 |
| | | | | 375/224 |
| 2014/0340170 A1* | 11/2014 | Mechanic | ................ | H03H 7/17 |
| | | | | 333/167 |

OTHER PUBLICATIONS

Grace Dennis, "Power Supply Units Used to Attack Air-Gapped Devices", VPNoverview.com, May 5, 2020, https://vpnoverview.com/news/power-supply-units-used-to-attack-air-gapped-devices/, 3 pages.

Guri et al., "PowerHammer: Exfiltrating Data from Air-Gapped Computers through Power Lines", IEEE Transactions on Information Forensics and Security, Apr. 10, 2018, vol. 15, pp. 1879-1890.

International Search Report and Written Opinion, from PCT/US2021/061990, dated Mar. 14, 2022, WO.

Z. Zorz, "Researchers use power lines to exfiltrate data from airgapped computers", Help Net Security, Apr. 13, 2018, https://www.helpnetsecurity.com/2018/04/13/data-exfiltration-via-power-lines/.

Zhao et al., "Powermitter: Data Exfiltration from Air-Gapped Computer through Switching Power Supply", China Communications, Feb. 2018, pp. 170-189.

\* cited by examiner

SUPPRESSION OF SIGNAL TRANSMISSION OVER A CONDUCTOR

REFERENCE TO RELATED APPLICATIONS

This application claims priority to, and the benefit as a continuation under 37 C.F.R. 1.53(b) of, U.S. patent application Ser. No. 17/392,688, filed Aug. 3, 2021, now U.S. Pat. No. 11,775,645, which claims the benefit of the filing date under 35 U.S.C. § 119(e) U.S. Provisional Patent Application Ser. No. 63/138,007, filed Jan. 15, 2021, the entire disclosures of which are hereby incorporated by reference.

TECHNICAL FIELD

The present application relates to a data security device intended to prevent data or other signals indicative of information or power transmission or conversion artifacts generated by computing equipment, or other electrically powered devices, from propagating over the electrical power infrastructure and allowing or facilitating a data breach, as well as detect and report or otherwise indicate when such data or other signals are currently being and/or have been propagated. Furthermore, this application relates to manipulation and cancelling of electrical waveforms found on power conductors and earthing grounds.

BACKGROUND

Air-gapping is a network security measure where a device, or an entire network of devices, is/are physically isolated, e.g., communicatively, from other devices or communications networks, e.g., isolated on local networks with no internet access and no access to other unsecured networks. Consequently, attempts to surreptitiously access such systems or devices would normally require someone to have physical access to the devices or systems to, for example, introduce malware or exfiltrate data/information therefrom.

Organizations with high security needs implement air-gapped systems to safeguard sensitive data against cyberattacks originating from external source and/or compromised systems on company networks or the Internet. Air-gapped systems are not only used in sensitive military facilities. They are also used by government and corporate entities to protect sensitive private data, classified files, intellectual property and critical infrastructure.

Generally, air-gapped computers are isolated both logically and physically from all kinds of existing common communication channels, such as USB ports, wireless and wired communications networks, etc. Although the feasibility of infiltrating an air-gapped computer has been proven in recent years, data exfiltration from such systems is still considered to be a challenging task and therefore remains a reliable method for securing devices.

However, air-gapped devices still require electrical power to operate and it has recently been shown that one can exfiltrate data through an air-gapped computer via its power supply, i.e., the power delivery infrastructure which conveys power (and grounding) from an external source, as well as any conditioning and/or regulating devices, which deliver operating power at the requisite voltages and current levels to the devices, which typically includes a switched-mode power supply commonly used in laptop and desktop computers and servers. For example, malicious computer program code, e.g., malware, can indirectly control the electromagnetic emission frequency of the power supply by leveraging the CPU utilization, i.e., by regulating utilization, and thereby power consumption, of the CPU in accordance with the data that the malware is trying to exfiltrate, and the emitted signals can be received and demodulated by a dedicated device. The data is effectively modulated, encoded, and transmitted on top of the current flow fluctuations induced by the device into the power delivery infrastructure, and then it is conducted and propagated through the power lines. This phenomena is known as a 'conducted emission'.

Even without the use of malicious code, information about the air gapped system may still be gleaned from the signals induced in the power conductors via the normal operations of the system.

Accordingly, it is possible to extract data from information technology (IT) equipment (ITE) by capturing data present in the power conductors which supply power to such devices. The presence of this data may be intentional through the use of malicious software or unintentional as a by-product of the normal operation of the electronic equipment.

Acquisition of this data can be accomplished without making direct contact with the electronic equipment and therefore may be referred to as an air-gapped attack.

Even where an IT facility provides its own power source, e.g. onsite power generation, that power source may be located away from the ITE, often in a separate building, and coupled with the ITE via power conductors running via, for example, conduit or overhead lines, all of which may be vulnerable to surreptitious access as described herein.

Furthermore, modern high-speed and highly accurate power measuring equipment, e.g., oscilloscopes, used to capture and analyze the signals makes this threat easy to carry out and over the recent years there have been published papers that instruct the public on the methods for such an attack.

Because electronic devices, such as computers, do not need malware installed to be vulnerable, billions of computer devices may be exposed.

Generally, this exploit involves sensing and analyzing electrical magnetic impulses that are:

Very low in power;
Very high in frequency (at least relative to the alternating current fundamental mains power frequency of, for example, 50 or 60 Hz);
Blended with other electrical impulse "noise"; and/or
Blended with the impulses from other electrical devices.

Presently, it takes fast, expensive electrical analysis devices, known as oscilloscopes or spectrum analyzers, to obtain this data and to derive anything meaningful from it. However, anyone can rent this equipment and the costs of such equipment continue to decline while their capabilities continue to increase. Cell phones can even be used for detection and recording of these impulses by just being nearby the power lines.

More particularly, magnetic fields are generated by the high-powered CPUs due to the billions of transistors present therein which may create enough switching energy that generate pulses onto the electrical power source conductors inside the computer or ITE. Furthermore, IT devices have power supplies that by themselves leave an electrical imprint, with these artifacts commonly referred to as "harmonics" and generally categorized as "switching noise." Together, the transistor switching induced signals and the device electrical imprint may find their way onto to, for example, the ground conductor via induction, or more simply, the radio principle.

That is, the magnetic impulses from the integrated circuits inside the ITE are imposed onto the power supply conductors. Next, the power supply imposes its switching signals also onto the power conductors bringing power, or providing ground, to the power supply. The ground conductor, connected to the power supply, then receives the power line signals via inductive coupling. That ground conductor, by design, implements an unbroken path from the ITE to physical earth for the purpose of providing a path for fault current to flow. This ground path may terminate away from the ITE, e.g., outside the facility or at another less secure location, where it may be accessible as described.

Attackers seeking to use a power line exploit (PLE) can exploit any portion of these vectors, but the easiest may be the ground path. More particularly, the electrical imprint or artifacts of the IT device's power supply may help an attacker to identify the type and sometimes even the manufacturer of the device, which may then help in interpreting the data that is also found imposed on the ground conductor.

Together, the transistor switching pulses and the power supply switching pulses create signals that make their way over to the ground conductor via inducement, or more simply, the radio principle. Once the signal is on the ground, it is detectable almost anywhere inside and outside a facility, such as a data center.

A PLE occurs when someone discovers these signals and translates the signals into meaningful data. The consequences of such an exploit may depend on what the attacker gathers and how it is then used. For example:

An inventory of devices on premise can be gathered;
The movement of devices can be tracked;
the absence or insertion of devices can also be tracked; and/or
Based on power supply signatures, certain wavelengths from devices of interest can be targeted for data exploitation.

Coupled with malware installed on targeted devices, a compromised computer can be much more easily detected, and data gathered, without any trouble from network security devices like firewalls.

Hackers have likely already done the leg work of using expensive o-scopes and other devices to analyze the electrical signals on test devices in isolated environments, so they know what to capture. Using simpler, smaller and cheaper devices like smart phones that have tremendous computing power, the electrical signals can be recorded and/or transmitted easily in a clandestine way.

The use of oscilloscopes and signal analyzers are not the only way to acquire the data, once a person knows what to capture. Other devices which may be employed in the acquisition of the magnetic impulses or signals include, but are not limited to:

A near field antenna;
A current transformer and data logger; and/or
A radio.

For example, in order to capture and show the electrical data used for a PLE:

Voltage and Current signals are captured in their various frequencies using an oscilloscope, which is a device that plots data point over time and produces lines that sometimes look like waves, which is why the pictures it creates are called "waveforms." To capture a large amount of high frequencies, advanced and expensive o-scopes may be needed.

Getting voltage data requires touching and breaking into the wires, which is not something a hacker may be able to accomplish undetected in most cases. However, to get current (amperage) data, a current sensing clamp needs to only surround a conductor, or be physically near it. This may be very possible to accomplish without detection.

Signals on the ground conductor may be found in the kHz, MHz and GHz realms.

Accordingly, there is a need to prevent the transmission of data or other information signals from IT devices over a conductor, such as the conductors which supply power to those devices.

DETAILED DESCRIPTION

The disclosed embodiments relate to a system, method, device, circuit and/or circuit/device architecture, which may be referred to as a power line firewall or filter, which is effective at cancelling or altering electrical signals or pulses, generated by, for example, digital electronic systems and components, that are induced, reflected, imposed, imparted or otherwise made present on the power supply conductors and/or the earthing or grounding conductors (if present) coupled therewith, e.g., the mains power supply conductors. The disclosed embodiments cancel these electrical signals thereby providing an effective means of preventing the exfiltration of various information, e.g., data, from a computing or similar system by means of power line emissions. The disclosed embodiments may perform this subjugation by: altering the shape of the fundamental current and voltage waveforms and also altering and diminishing any non-fundamental frequency waveforms to a point where they are no longer substantially measurable or discernable/detectable; and preventing the communication via inductive coupling of any electrical signals on mains current onto the grounding path or vice versa. It will be appreciated that the disclosed embodiments may be deployed in conjunction with conductors carrying alternating current (AC), e.g., between an AC power source and an AC/DC converter which supplies DC to a digital electronic system. or direct current (DC), e.g., between the AC/DC converter and the digital electronic system(s) coupled therewith.

In another embodiment, in addition to the cancellation or alteration, the disclosed method, device, circuit and/or circuit/device architecture may further detect, analyze and/or log, indicate and/or otherwise report the current or past presence of electrical signals or pulses, generated by, for example, digital electronic systems and components, that are induced, reflected, imposed, imparted or otherwise made present on the mains power supply conductors and/or the earthing or grounding conductors (if present). This functionality may be used, for example, for implementing investigative or remedial measures, inventory control and/or failure prediction or monitoring.

Figure 4:
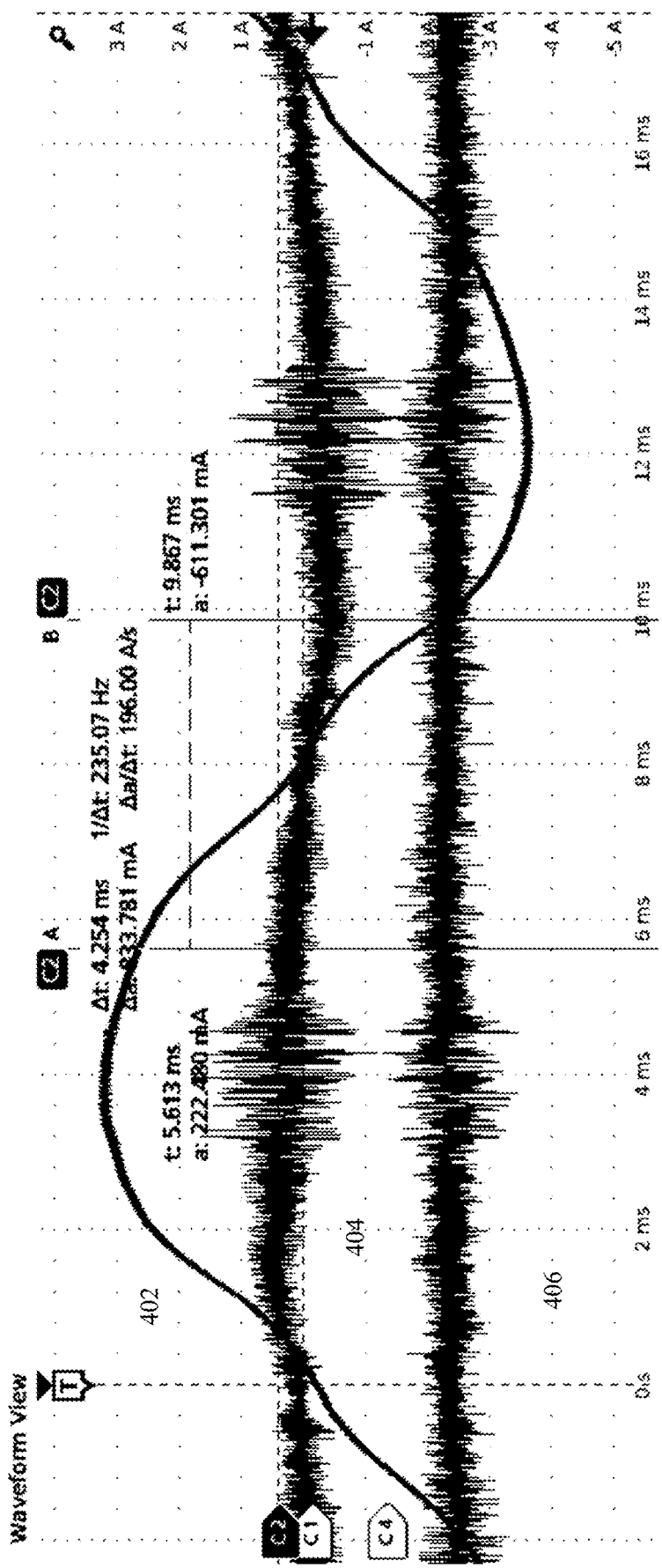
FIG. 4 illustrates exemplary signals on the line, neutral and ground conductors where the disclosed embodiments are not being used.

FIG. 4 shows a depiction of the baseline signals measured between an Information Technology Equipment ("ITE"), which may include one or more devices, and the AC mains power source where the disclosed embodiments have not been implemented. The light blue line (Line current) 404 and the bright green line (ground current) 406 show high frequency signals present along with the fundamental 60 Hz signal, which is most clearly seen in the yellow line (Line-Neutral voltage) 402, which may be indicative of information generated by the ITE.

Figure 5:
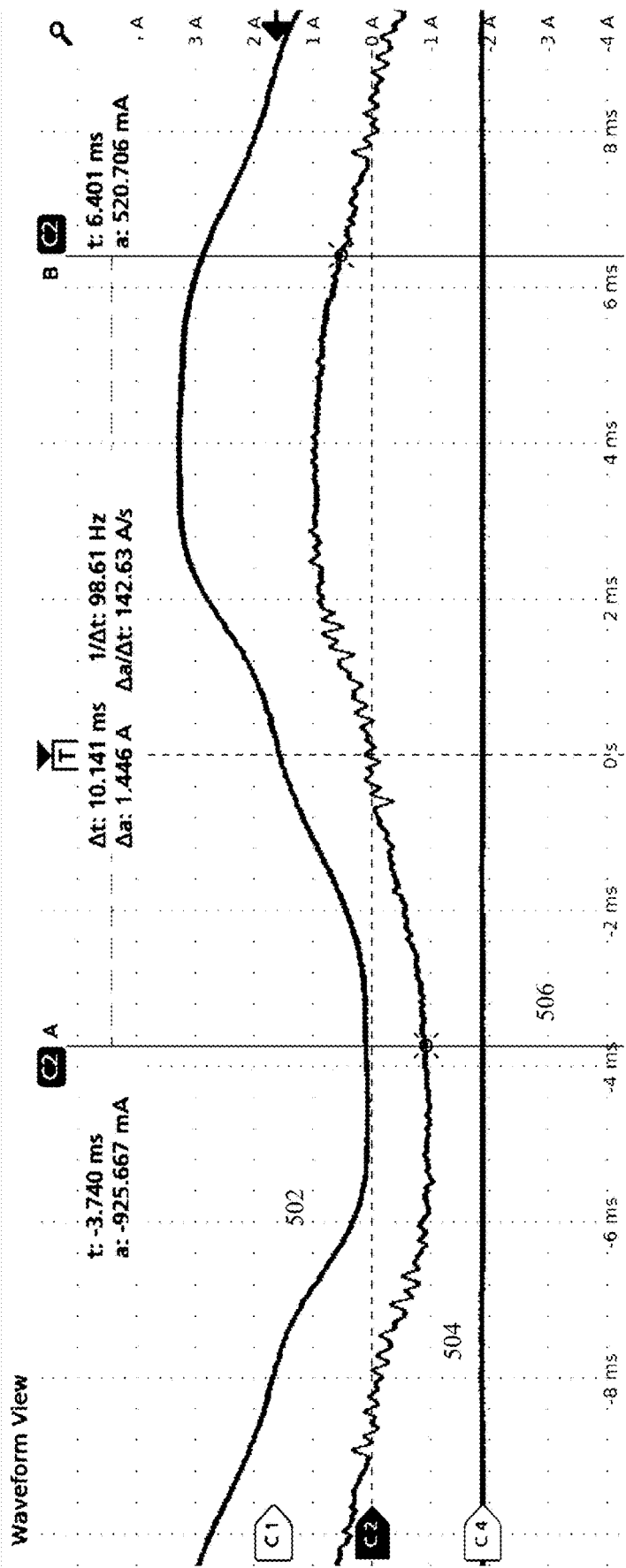
FIG. 5 illustrates the exemplary signals of FIG. 4 with the disclosed embodiments in use.

FIG. 5 shows a depiction of remediated signals, resulting from the implementation of the disclosed embodiments between the ITE used in FIG. 4 and the AC mains power source, the measurement having been taken between the AC mains power source and the implementation of the disclosed embodiments. As in FIG. 4, the light blue line 504 depicts line current, the bright green line 506 depicts ground current and the yellow line 502 depicts line-neutral voltage. As can be seen, the high frequency signals shown in FIG. 4 have been significantly diminished, if not substantially eliminated, due to the operation of the disclosed embodiments.

Generally, the disclosed embodiments: prevent the ITE's switched mode power supply imprint or artifact(s) and the signals indicative of CPU transistor switching from moving upstream of the ITE's power supply and prevent any signals from also being induced or otherwise imposed onto ground.

In one embodiment, the disclosed system is integrated with the power supply of the ITE. In an alternative implementation, the disclosed embodiments may be deployed proximate to the point of use, or immediately at the power input of the ITE. It will be appreciated that the disclosed embodiments may be deployed at any point along the power distribution infrastructure between the power source, and/or ground termination point, and the ITE/device(s) which is/are being powered thereby and that the deployment location may be implementation dependent and/or dependent upon the physical configuration of the power distribution infrastructure and/or assessed vulnerabilities of the devices to be protected, the power distribution infrastructure supplying power thereto and/or physical environment in which the devices are located. It will be appreciated that it may be desirable to minimize the physical distance between the power supply of the ITE and the disclosed embodiments so as to minimize the distance over which the unfiltered signals may travel, and therefore are vulnerable to attack, before being remediated by the disclosed embodiments. In one embodiment, the disclosed embodiments may be integrated, or used in conjunction, with a power protection device, such as a surge or transient event suppressor which prevents power surges, spikes or other transient events from reaching the power supply of the ITE. In such an implementation, the disclosed embodiments may be implemented between the power source and the power line protection device/mechanism or between the power line protection device/mechanism and the power supply of the ITE. Alternatively, the disclosed embodiments may be used in lieu of a power line protection device. In another implementation, the disclosed embodiments may be incorporated or otherwise integrated with a power distribution unit (PDU) or similar point-of-use power distribution mechanism as commonly found in a data center cabinet, equipment rack or similar structure.

In particular, the disclosed embodiments may reform the voltage and current waveshapes conveyed over the conductors to a linear profile so that, for example, one ITE device cannot be uniquely identified from another solely based on electrical properties and, further, prevent inductive coupling of the magnetic impulses created by the operation of the device, e.g., CPU, with nearby wiring, e.g., the wires supplying power and ground to the ITE, which represent or may be indicative of data or artifact signals. This results in the removal and/or obfuscation of any signals that could convey information, exploitable or otherwise.

The disclosed embodiments may be passively implemented so as not to present a work load to the ITE nor require any processing power to enable the disclosed functionality, and further the disclosed embodiments may not appreciably detract from the available power in the circuit connected to the ITE, minimizing cost of any additional power consumption thereby. Alternatively, as will be described, additional functionality may be provided to detect and indicate or otherwise report anomalous signals which the disclosed embodiments are currently remediating, or have been remediated. This additional functionality may be powered from the same power source supplying the ITE or a separate power source.

Figure 1:
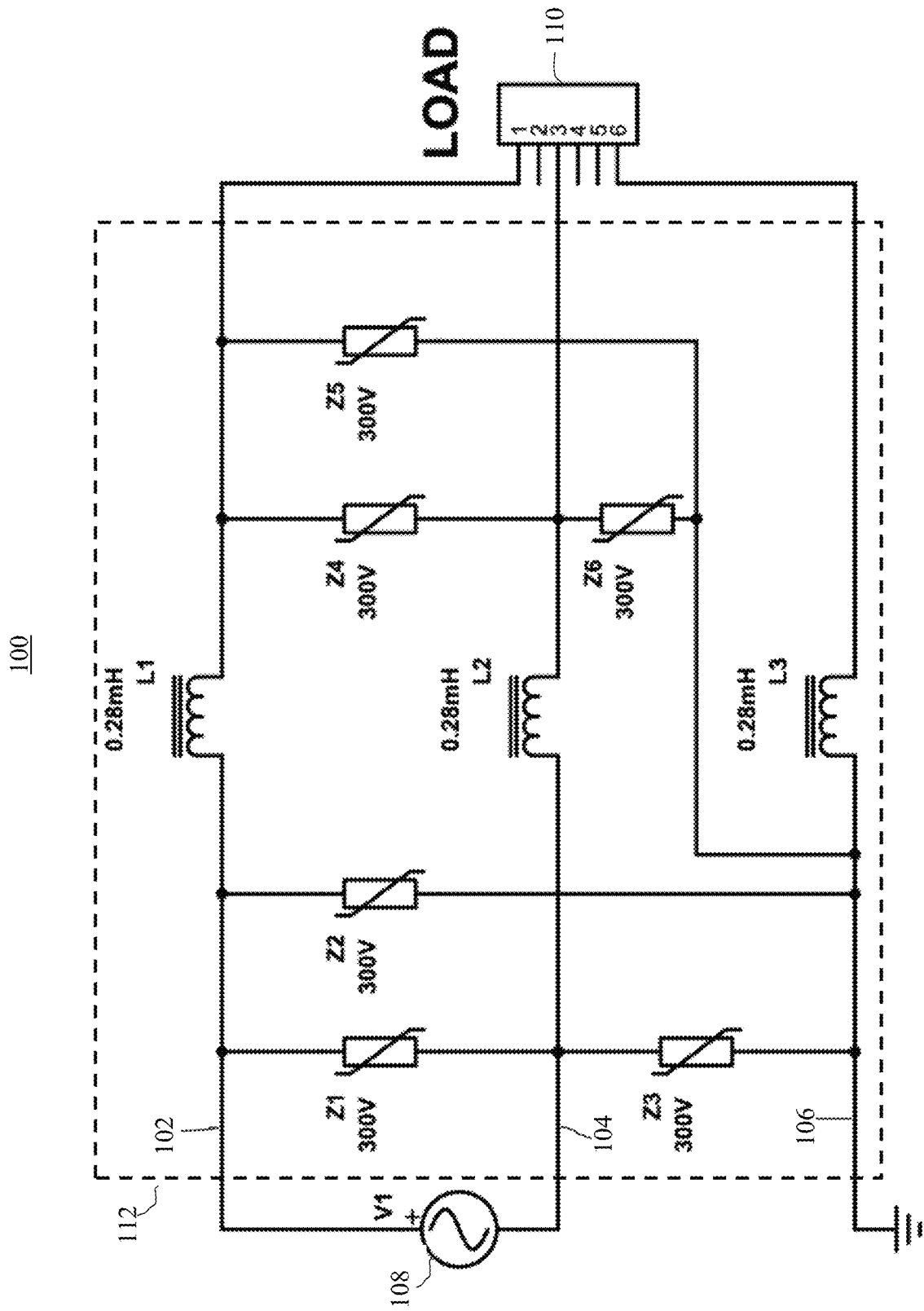
FIG. 1 depicts a system for suppressing data exfiltration over a conductor according to one embodiment.

FIG. 1 depicts an example of a system 100 for suppressing data exfiltration over a conductor according to one embodiment. The disclosed system 100 includes a circuit architecture, an example of which is shown in FIG. 1 and described in more detail below, which may be adjusted for implementation with different electrical supply configurations, e.g., wye, delta, split-phase or single-phase, etc. In particular, the disclosed architecture, as will be described, includes an inductor L1, L2, L3 coupled in series with each conductor 102, 104, 106 of the particular electrical supply configuration, e.g., an inductor L1, L2, L3 for each of the one or more line 102, neutral 104 and/or ground conductors 106 present as dictated by the particular electrical supply configuration. In addition, the disclosed architecture may further include a passive switching device Z1-Z6, such as a metal oxide varistor, Zener diode or gas tube, coupled between each pair of conductors 102, 104, 106, dependent on the particular electrical supply configuration, on both the line/source and load sides of the inductor(s). In the simplest implementation, only a single inductor L3 may be provided in series on the ground path 106.

The passive switching devices Z1-Z6, which may include metal oxide varistors, Zener diodes or gas tubes, are, generally, variable resistance devices which open at a particular voltage level. Such devices may be used in surge suppression implementation as they can be used to dissipate energy. In the disclosed embodiments, the passive switching devices Z1-Z6, by closing or otherwise clamping at particular voltages, are used to control the growth and collapse of the fields generated by the inductors L1, L2, L3 and thereby avoid magnetic saturation of the inductors L1, L2, L3.

Figure 7:
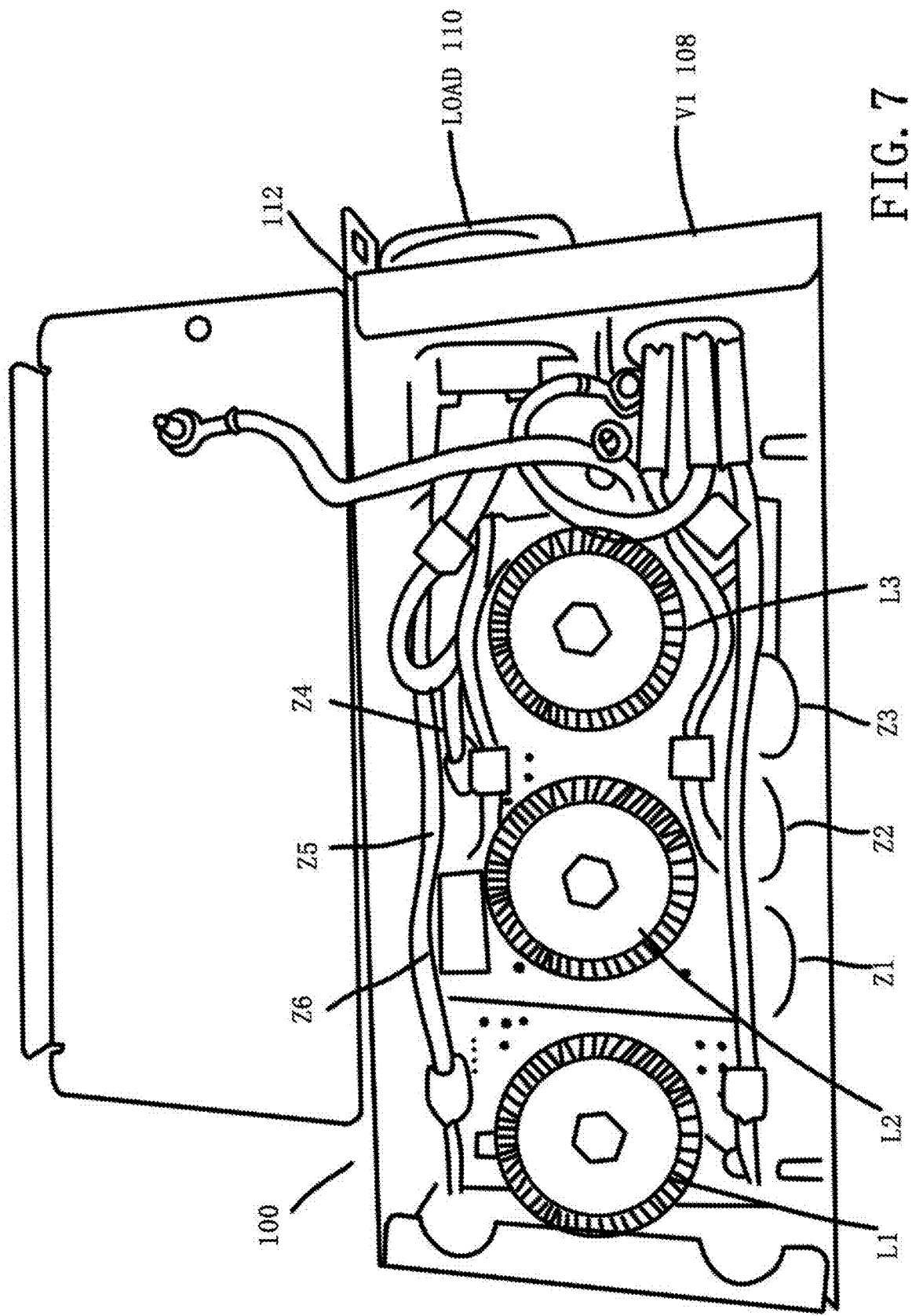
FIG. 7 depicts an example implementation of the system of FIG. 1 according to one embodiment.

As shown in FIG. 1, the disclosed system 100 may be implemented with a circuit that operates in wye, delta, split-phase or single-phase electrical supply configurations. In one embodiment, the disclosed system 100 is implemented as a device or apparatus having an enclosure 112, e.g., made of aluminum, with one or more input and output connectors for electrically connecting the device with the power source 108 and with the device 110, e.g., an ITE or other "signal source", to be powered, which may be, for example, mounted on a computer/server rack and coupled between the power source 108 and the power supply (not shown) which provides power, e.g., conditioned or converted (such as AC to DC), to the devices 110 also mounted on the rack or proximate thereto. In one embodiment, the system 100 features physical safety and/or security mechanisms (not shown), such as rivets or other mechanisms, to prevent and/or detect tampering or otherwise comply with industry or regulatory requirement, e.g., IEC/UL safety guidelines 62368-1. An example implementation of the system 100 of FIG. 1 is shown in FIG. 7.

In one embodiment, the system 100 may include a single input for receiving power from a power source 108 and multiple outputs for providing the received power to more than one device 110.

For simplicity, this description will use the single-phase use case. However, it will be appreciated that, as described above, the disclosed embodiments may be implemented in wye, delta, split-phase and other electrical supply configurations, now available or later developed.

Generally, the disclosed embodiments relate to a system 100, device and/or apparatus for suppressing transmission of signals over a conductor 102, 104, 106 coupled between an AC or DC power source 108 and a device/ITE/signal source 110, e.g., a load or device, powered thereby for which the suppression of signals imposed on the conductors by the device is desired, the apparatus comprising: a first input for receiving power from the power source 108 via one or more power conductors 102, 104; a second input for connecting to a ground conductor 106; an output for providing the received power to the signal source 110 and coupling the signal source 110 with the ground conductor 106; and a circuit coupled with the input and the output, the circuit comprising: for each of the one or more power and ground conductors 102, 104, 106, an inductor L1, L2, L3 forming an electrical path from the first or second input through the inductor L1, L2, L3 to the output. In one embodiment, the circuit further comprises: for at least one pair of conductors of the one or more power and ground conductors 102, 104, 106, first and second passive switching device Z1-Z6 coupled therebetween, the first passive switching device Z1 being coupled between the input and the inductor L1, L2, L3, and the second passive switching device coupled between the inductor L1, L2, L3 and the output. In one embodiment, the apparatus further includes an enclosure 112 operative to enclose the circuit and providing one or more electrical connectors for each of the first and second inputs and output.

Referring to FIG. 1 in more detail, there is shown a system 100 according to one embodiment, which includes a circuit as shown, which suppresses transmission of signals over a conductor 102, 104, 106, or otherwise prevents the exfiltration of data or other information, from a device 110, referred to as a Load, or other signal source, receiving power thereby from a power source V1 108, such a mains/utility power supply, an onsite power generation or power supply, or other source of power including solar, wind, fuel-cell, hydroelectric, or battery based power supplies, via one or more conductors 102, 104, 106, such as a wire, cable, bus bar, etc. or other electrically conductive substrate, including, in wireless power delivery applications, air. In one embodiment, the signal source 110 comprises a computer or other data processing device, such as a server. In one embodiment, the signals comprise analog signals, which may be indicative of digital information processed or generated by the signal source 110, imposed on one or more of the conductors 102, 104, 106 by the signal source. In one embodiment, the circuit of the system 100 of FIG. 1 is further coupled with a power line protection device operative to protect the signal source 110 from surges and/or transient power events.

In one embodiment, the system 100 may be implemented using a circuit, such as that depicted in FIG. 1, operative to alter the shape of a fundamental current and voltage waveforms and also alter and diminish any non-fundamental frequency waveforms such that they are not measurable or detectable, and further prevent the communication thereof via inductive coupling of any electrical signals on mains current onto the grounding path or vice versa.

The system 100 includes inductors L1, L2, L3 implemented in series on each of the Line 102, Neutral 104 and Ground 106 paths with uniform inductance values focused on the data signal broad-spectrum range, e.g., 100 Hz-250 MHz, but permissive of the nominal power frequency range, e.g., 50-60 Hz nominal, although with appropriately adjusted components, the disclosed embodiments may operate at other nominal frequencies, such as 440 Hz.

Passive switching components Z1-Z6, such as metal oxide varistors (MOV's), are located in parallel across the Line-Neutral 102 104, Line-Ground 102 106, and Neutral-Ground 104 106 node pairs (connected by at least one MOV) on both the Line side and the Load side of the inductors L1, L2, L3, with the exception that the Neutral-Ground 104 106 and Line-Ground 102 106 MOV pairs on the Load side of the inductor connected to the Line side of the Ground path 106.

This circuit configuration of the system 100 performs the necessary waveform shaping of signals on all three paths, thus altering or cancelling any data/information signals imposed on those paths by the load. Furthermore, the wave-shaping, which lowers the frequency and amplitude of the data signals, prevents inductive coupling or coupling emissions, whereby a signal present one conductor magnetically becomes present on an adjacent one, from occurring. As was described above, in wye, delta, split-phase and other electrical supply configurations, generally, a similar architecture is utilized, e.g. each conductor includes an inductor in series, and each conductor pair includes a passive switching device coupled therebetween on both the line/supply and load sides.

FIG. 7 shows an image of device/apparatus which implements the example circuit of the system 100 of FIG. 1 described above.

It will be appreciated that the MOV's Z1-Z6 can be substituted using other passive switching devices such as gas tubes or Zener diodes.

In one embodiment, the inductors L1, L2, L3 comprise a powdered-iron core manufactured by Micrometals Inc of Anaheim, California, part number MS-157125-2 wound with 41 turns of AWG #14 solid wire to provide an inductance of 0.28 mH.

In an example implementation of the circuit of the system 100, the nominal inductance values of the inductors L1, L2, L3 are equal. For example, the inductance values of L1, L2, and L3 may be in the range of 0.1 mH to 0.3 mH.

In another implementation, the nominal inductance values of L1 and L2 may be in the range of 1.0 mH to 2.0 mH and L3 is in the range of 0.1 mH to 0.3 mH.

In yet another implementation, the nominal inductance value for L1, L2, and L3 may be in the range of 0.1 mH-0.3 mH, but metal-oxide varistors across Line-Neutral 102 104 on both the Line and Load side of the corresponding inductors need only be present. That is the MOV's Z2, Z3, Z5 and Z6 may be eliminated.

In still another implementation, the nominal inductance value for L1, L2, and L3 may be in the range of 0.1 mH-0.3 mH, but no metal-oxide varistors or other passive switching devices need be present.

Figure 2:
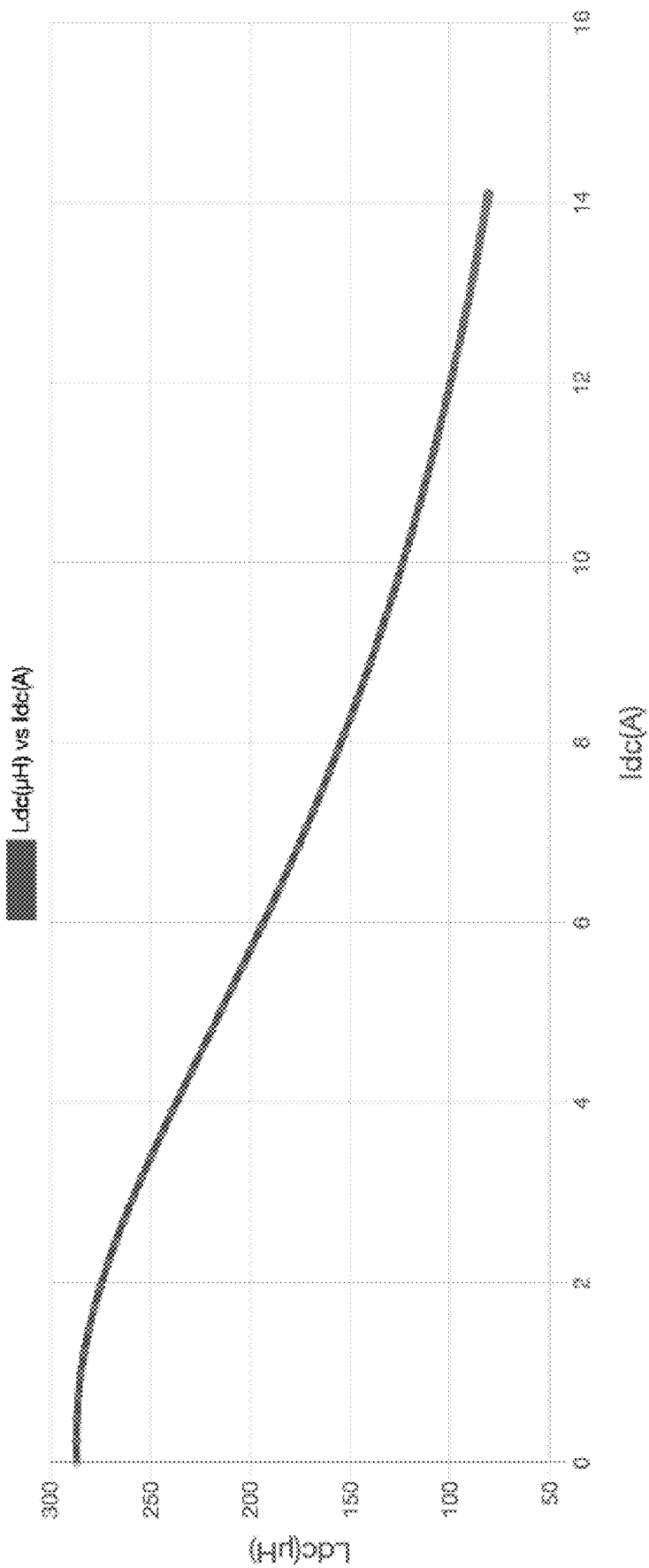
FIG. 2 depicts the inductance curve over the available current range for the example inductors which may be used with the circuit of FIG. 1.

FIG. 2 depicts a graph showing the inductance curve over the available current range, i.e., the DC Inductance versus the DC Current of an inductor manufactured to operate in the 0.1 mH-0.3 mH range, for the example inductors L1, L2, L3 which may be used with the circuit of the system 100 of FIG. 1, showing that the inductors are not saturated.

Figure 3:
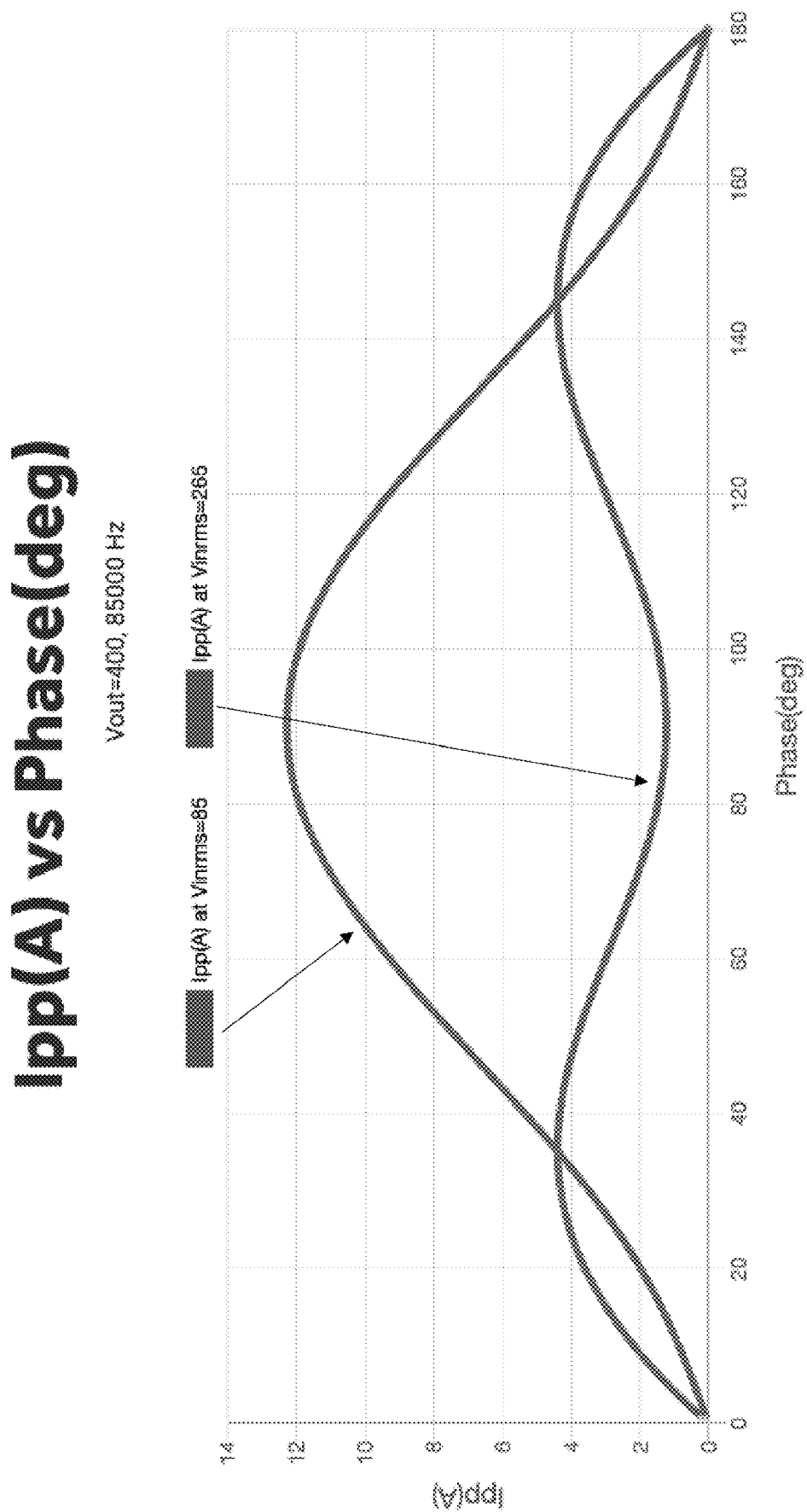
FIG. 3 illustrates depicts the current/Amps peak to peak vs phase for the example inductors which may be used with the circuit of FIG. 1.

FIG. 3 depicts a graph of the typical peak to peak current vs signal phase for the example inductors L1, L2, L3 manufactured to operate in the 0.1 mH-0.3 mH range which may be used with the circuit of the system 100 of FIG. 1, showing inductor response, i.e., illustrating the power levels for generating the most and the least inductance.

In one implementation, the disclosed embodiments are implemented as a device, apparatus or other article of manufacture which may include an enclosure 112, such as an aluminum enclosure, which may be rack mountable and/or free standing, containing one or more circuit boards implemented as described herein and having one or more inputs and/outputs, such as electrical sockets/plugs, pig-tails, etc., for coupling the apparatus with a power source 108 and ground, e.g., the conductors therefrom, and one or more loads/devices 110 to be powered thereby.

Figure 6:
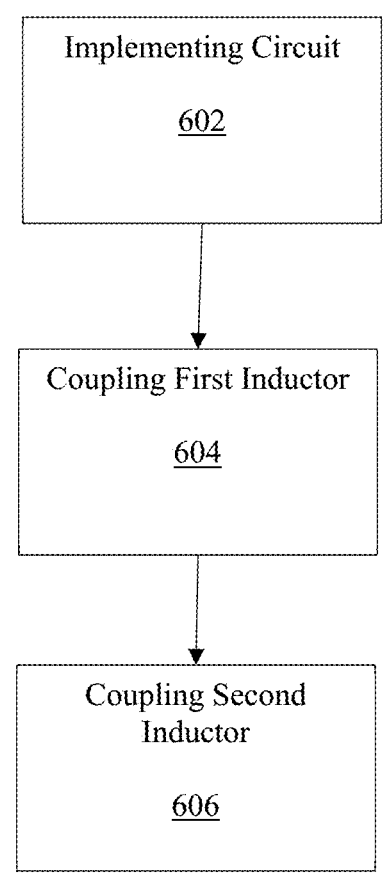
FIG. 6 depicts a flow chart showing operation of a device incorporating the circuit of FIG. 1 according to some embodiments.

FIG. 6 depicts a flow chart showing the example operation, such as of the system 100, of the disclosed embodiments for suppressing transmission of signals over a conductor coupled between a power source 108 and a signal source 110, e.g., a load including ITE device(s), powered thereby.

Generally, the operation may include conveying power received from the power source 108 to a power supply of the signal source 110 and not conveying a switched mode power supply imprint and/or signals imposed by CPU transistor switching from the power supply toward the power source 108 or a ground coupled therewith. For example, the operation may include altering the shape of a fundamental current and voltage waveforms and altering and diminishing any non-fundamental frequency waveforms such that they are not measurable or detectable; and preventing the communication thereof via inductive coupling of any electrical signals on mains current onto the grounding path or vice versa.

More particularly, the operation may, for example, include: implementing, electrically, a circuit between the power source 108 and the signal source 110 receiving power therefrom, the circuit receiving power from the power source 108 and conveying the received power to the signal source 110 (Block 602), the implementing further comprising: coupling a first inductor L1 in series between a first phase conductor 102 and a first output line, wherein power supplied by the power source 108 to the first output line flows through the first inductor L1 (Block 604); and coupling a second inductor L2 in series between a second phase conductor 104 and a second output line, wherein power supplied by the power source 108 to the second output line flows through the second inductor L2 (Block 606); and wherein an inductance of each of the first inductor L1 and the second inductor L2 increases when power at frequencies greater than the nominal frequency flows through the first phase conductor 102 and the second phase conductor 104.

As mentioned above, in another embodiment, in addition to the cancellation or alteration, the disclosed method, device, circuit and/or circuit/device architecture further detect and indicate or otherwise report the current or previous presence of electrical signals or pulses, generated by, for example, digital electronic systems and components, that are induced, reflected, imposed, imparted or otherwise made present on the mains power supply conductors and/or the earthing or grounding conductors (if present).

In particular, as will be described, the disclosed embodiments may be modified, as shown, for example, in FIG. 8, to detect and log, indicate and/or report when signals from the signal source are present and being suppressed, or previously present and suppressed. For example, the system 100 may further include an indicator 818, such as a light, e.g. an LED light, audible alarm and/or other annunciator which indicates when signals are present and are currently being suppressed as described herein and/or have previously been present and suppressed, e.g., recently or since a reset action was performed. Alternatively, or in addition thereto, the disclosed embodiments may include a data processing device 816 which provides for data/event analysis/logging/recording, such as a detector/converter and storage device, implemented with a computer processor and memory, capable of storing data indicative of the current and/or past detection and suppression of signals from the signal source 110. Alternatively, or in addition thereto, the disclosed embodiments may include a wired or wireless communications interface 818, such as a communications port or wired or wireless network interface, which enables the disclosed embodiments to communicate data indicative of current and/or past detection and suppression of signals from the signal source 110, such as from the data/event logging functionality. This may be used for further analysis and/or remediation.

As will be described, the disclosed embodiments may further include data processing functionality 816 operative to analyze the detected and suppressed signals in order to derive information therefrom. For example, the data processing functionality 816 may be used to identify the signal sources 110 coupled with the disclosed embodiments, when one or more signal sources may be coupled with one or more instances/deployments of the disclosed embodiments, based on unique characteristics of the detected/suppressed signals, or changes thereto. Once identified, the data processing function 816 may further determine, e.g., using prior identification data as a baseline, when subsequently detected/suppressed signals, or a lack thereof, are indicative of physical removal of a signal source 110, addition of a new signal source 110, and/or an actual or potential fault or failure of a signal source 110. Historical data, stored in a memory, may further permit stateful analysis and identification of changes and trends.

More particularly, in one embodiment, the disclosed system 800 may be further operative to uniquely identify a signal source 110, such as an electrically powered device, from among a plurality of signal sources 110 deployed in a particular implementation, via information gathered between it and its power source 108. Among other benefits, the information gathered can subsequently be used, for example, to predict failure or track the locus and movement of the device 110.

Certain, if not all, electrically powered devices 110, including those described herein, interact with their power source 108 in a variety of ways, measurable through certain power quality components which may be measured on the power and ground conductors coupled therewith. Power quality components, such as harmonic distortion, EMI, higher-frequency noise or injections, current and voltage patterns and grounded path content, to name the most prevalent, but certainly not to exclude others, are present in some amplitude and frequency, or not, with every electrically powered device 110. However, due to the branching topology used for traditional electrical distribution infrastructures, whereby a large source of power 108 is splintered and distributed through branches of lower voltage and current maximums towards the points of use, much of power quality components of particular devices 110 either becomes cancelled, added or multiplied as they are conveyed through the infrastructure. It is therefore difficult to obtain, from the power distribution infrastructure itself, exact, reproducible information that describes any one given device 110 anywhere in the infrastructure, from the most upstream power source 108 location to the closest point at the input of the device 110 under examination.

The disclosed embodiments may detect, isolate, extract or otherwise derive a device's power quality components from the electrical infrastructure without having to separate the device from the infrastructure. In one embodiment, the disclosed system 800, as shown, for example, in FIG. 8, inserts a series component in each electrical path, including ground, that is excited by the presence of one or more power quality components, and thereby producing voltages that can be interpreted as data or from which information or data may be extracted or otherwise derived. The disclosed embodiments may provide an active probe architecture, one that acts upon the power signal, conditioning it in a favorable manner so that voltages from the series components can be produced—as a response to the conditioning performed. These voltages may then be captured, e.g., in a snapshot of the voltages present at a given time (or averaged or accumulated over a period of time), converted to digital representations thereof and interpreted by a computing system/processor with appropriate algorithms and storage to, for example, determine the presence of signals from a signal source 110 as described above, and/or create a fingerprint of a given device 110 and/or its present operational state, i.e., a substantially unique digital identifier. This fingerprint may be further maintained and the quality of the fingerprint perfected over time as more snapshots are taken and, for example, averaged or otherwise correlated or aggregated. The fingerprint may further serve as a baseline for comparison with other data to identify changes or trends related thereto.

The series components may be described as inductors, similar to those described above for use in detecting and suppressing signal exfiltration, with an additional winding, e.g., a "sensing" winding, incorporated therein used to sense and transmit the voltage data signal. While this construction resembles a toroidal transformer, in the disclosed embodiments, the sensing winding's signal is used as a data signal indicative of the conditioning being performed and/or presence of one or more power quality components and not to deliver energy at a different voltage. That is, the disclosed embodiments are not transforming power on the primary winding to a secondary winding for the purpose of delivery of a different voltage, load side current or motive power.

It will be appreciated that an inductor of sufficient inductance, gauss, oersted and resistance may be placed in series in a given electrical supply path, e.g., 1 mH average over the expected operating range of the inductor. This inductor, due to its power conditioning intent previously stated, will interact with the varying voltage and current signals being conducted via the electrical supply path. Because there is sufficient magnetic flux density present in the inductor, a secondary winding, i.e., the sensing winding described above, around this inductor will have a voltage signal induced upon it. Depending upon the number of turns of the secondary winding, lesser or greater voltages, and subsequently lesser or greater data precision may be obtained from the inductor. Generally, the secondary winding acquires a voltage signal generated by the various magnetic fields in the inductor for the purposes of detecting and measuring the activity of the inductor. An example secondary winding might include 10 turns of 24 AWG wire wound against the primary winding of the inductor. The secondary winding may produce voltages in the range of 10 millivolts to 1 volt based on the fundamental voltage signal and noise events from 10 Hz to 250 kHz. These voltage can be measured by an oscilloscope or recorded by a data logger.

In one embodiment, as described above, the inductor may be deployed for the purpose of power conditioning, with the secondary sensing winding added to provide the described sensing function. However, an inductor including the sensing winding may be deployed solely for sensing voltages as described and need not also be deployed to perform a power conditioning function.

However, as has been previously introduced, in order to sense these power quality components, they must be interacted with. Therefore the inductor used for sending power quality components must be designed to perform some level of power conditioning in order to produce the magnetic flux needed for sensing voltages.

An inductor is known to abhor a change in both current and voltage frequencies, permitting the flow of direct current (DC) with only added wire length resistance in the coil, whereas alternating current (AC) is met with a range of inductive reactances. These reactances are the result of the strength of inductance created by the permeability, magnetic cross-section and number of turns of an inductor, as previously disclosed. The accuracy of the data gathered from an inductor designed to sense power quality components, referred to herein as a "sensor," is dependent upon the availability of the broadest spectrum of inductance possible. Such a spectrum is currently only possible utilizing an inductor designed to support a large gauss/oersted rating at the top end of its rated root mean square (RMS) for a given application. The inductor must not generally saturate throughout its expected operating range so that it may always have magnetic flux density (MFD) available to create the sensing voltage. The voltages must be available for all points of the AC sine wave.

With the individual inductor as described above, its number and arrangement within a circuit must be examined. Electrical devices range from simple designs, like coffee pots, to complex designs such as web servers or electronic gaming machines. Simple devices will have fewer power quality components to measure, as they interact with the infrastructure in less complex ways than does, for example, the electronic web server. In one embodiment, the disclosed system for uniquely identifying an electronic device is operative to produce a fingerprint representative of that device with the highest level of certainty possible. Therefore, a number of power quality components ("PQC"'s) may be obtained to support this function.

For example, one PQC may provide a precision of 1 in 10; Two PQC=1 in 100; Three PQC=1 in 1000; Four PQC=1 in 100,000; Five PQC=1 in 100,000,000; Six PQC=1 in 100,000,000,000,000,000, etc.

The disclosed embodiments may collect one or more of the following PQC data points for each electrical power path.

RMS voltage
Noise voltages
RMS current
Non-RMS currents

Current switching noise

Peak currents and voltages

The disclosed embodiments collect this information on each electrical path, therefore an implementation for use, for example, with a single phase power source will have three sensors, one on neutral, one on line and one on ground. Likewise, an implementation for use with a three phase delta power source will have four sensors, one on each of three lines and one on ground, and so on for all other electrical source configurations.

The ground path sensor acts in a manner different from the line or neutral sensors. In particular, the construction of the ground path sensor is limited and governed by regulatory requirements and/or international standards that guarantee an available fault current path. The disclosed sensors can presently comply with these standards. The ground sensor produces PQC data for ground noise currents RMS current on ground current reflections from computing operations ground faults induced radio currents failed product componentry In one embodiment, the disclosed system may include a processor and memory, such as in the form of a single board computer (SBC), system-on-chip, or similar device having data processing and data storage capability, and may further include an analog to digital converter operative to convert the sensed analog voltage signals to digital data/signals indicative thereof. The processor is used to receive the secondary voltage signals from each inductor in the data acquisition circuit, such as the system described above. The processor may be operative to, for example, collect and analyze the sensed voltage signals and initially form a baseline representation, or fingerprint, of the one or more devices connected therewith from the collected sensor data, to subsequently refine this fingerprint through an ongoing/iterative/periodic snapshot process, extract or otherwise derive other information and to produce and communicate notifications based on predetermined thresholds being met or not met.

The process used by the disclosed embodiments to uniquely identify an electrical device may be dependent, to a large degree, on learning about the device through an initial baselining procedure which precedes normal operation. This may be accomplished when a device is first acquired and/or deployed. A typical process, which may be referred to as a "learning mode," may involve connecting the device to the disclosed system and enabling a power on and stability sequence which creates sufficient data over a period of time to allow the disclosed system to create a fingerprint. The identification process may be able, through advanced database connectivity and processing described later in this document, to ensure that the fingerprint is truly unique among all other fingerprints known to the data collection domain. The baseline fingerprint, now established and stored, may then be revisited, refined, and compared on periodic and ad hoc bases to ensure accuracy and produce notifications in a timely manner. Refinement of the baseline fingerprint may be accomplished by removing outlier values over time, or those values that have an appearance frequency not in accordance with more frequent values. Further, a "threshold" for a time range may be employed to prevent the refining process from diluting the fingerprint too far before the disclosed embodiments commence normal operation as described. In one embodiment, the learning mode is implemented as a secure process to prevent tampering or manipulation of generation of the baseline fingerprints. Where the disclosed embodiments are coupled with more than one electrical device, this initial baselining procedure may still be used to uniquely identify each device but may require additional time to develop separate baseline fingerprints of each device.

The fingerprint snapshot frequency may be defined such that the processor is provided with sufficient cycles to continually process, refine, and monitor the sensor signals to have the most current data to compare against the baseline fingerprint. This capability allows the reporting process to be timely and accurate.

As determined by the software algorithm, the fingerprint baseline, the ongoing refined fingerprint, and any and all anomalies deemed reportable are sent to a notification process executed by the processor. The processor may be coupled with a communication device, such as a wired or wireless communications interface, e.g., WiFi, Ethernet, or CENELEC. The processor may be operative to communicate notifications, such as via a wired or wireless network, to a data collection system or client device, such as a mobile device or to a central aggregate database where further processing and dissemination may occur. It will be appreciated that the disclosed embodiments may provide a stand-alone solution, capable of acquiring, processing, and reporting through a communications means the state of the monitored device's fingerprint status.

Where more than one of the disclosed identification devices may be deployed in a given installation, referred to as a "collection domain," the data produced and transmitted by the processors of those deployed devices may be collected by a central database server, for example, for further processing and transmittal. A collection domain may be defined as any number of unique identification devices able to be deployed and controlled under a single user's area of influence, regardless of geography. Employing real-time or near real-time collection and processing in a database server expands the capabilities of the disclosed unique identifier solution. For example, the disclosed embodiments may enable determination of:

The presence of signals indicative of an exfiltration event;

Movements of devices from one location to another

Removal\insertion of a device from\to power

State changes of several devices at a point in time at a certain place or places Identification of authorized or unauthorized insertions into power source.

Predictive failure of a devices

Power demand of devices

Power quality of devices

The disclosed unique identification solution for an electrically connected product employs an excitable series sensor on each available electrical path for the purposes of producing voltage signals that correspond to the state of various power quality components produced by the connected product. These voltage signals are collected by a processor, processed to form a meaningful baseline fingerprint and subsequent comparison fingerprints. Furthermore, the processor can transmit this information through a notification process to any number of end points, including mobile devices or a central data processor for the purposes of many-to-one data analysis and reporting. The information gathered by each processor, being oriented towards the presence of power and its subsequent utilization, can be interpreted to support the unique goals of various end users. An end user may be interested in product/asset tracking, predictive failure or energy usage. Such a system provides a new and deep dimension to understanding the interaction of electrical products with their power sources.

Figure 8:
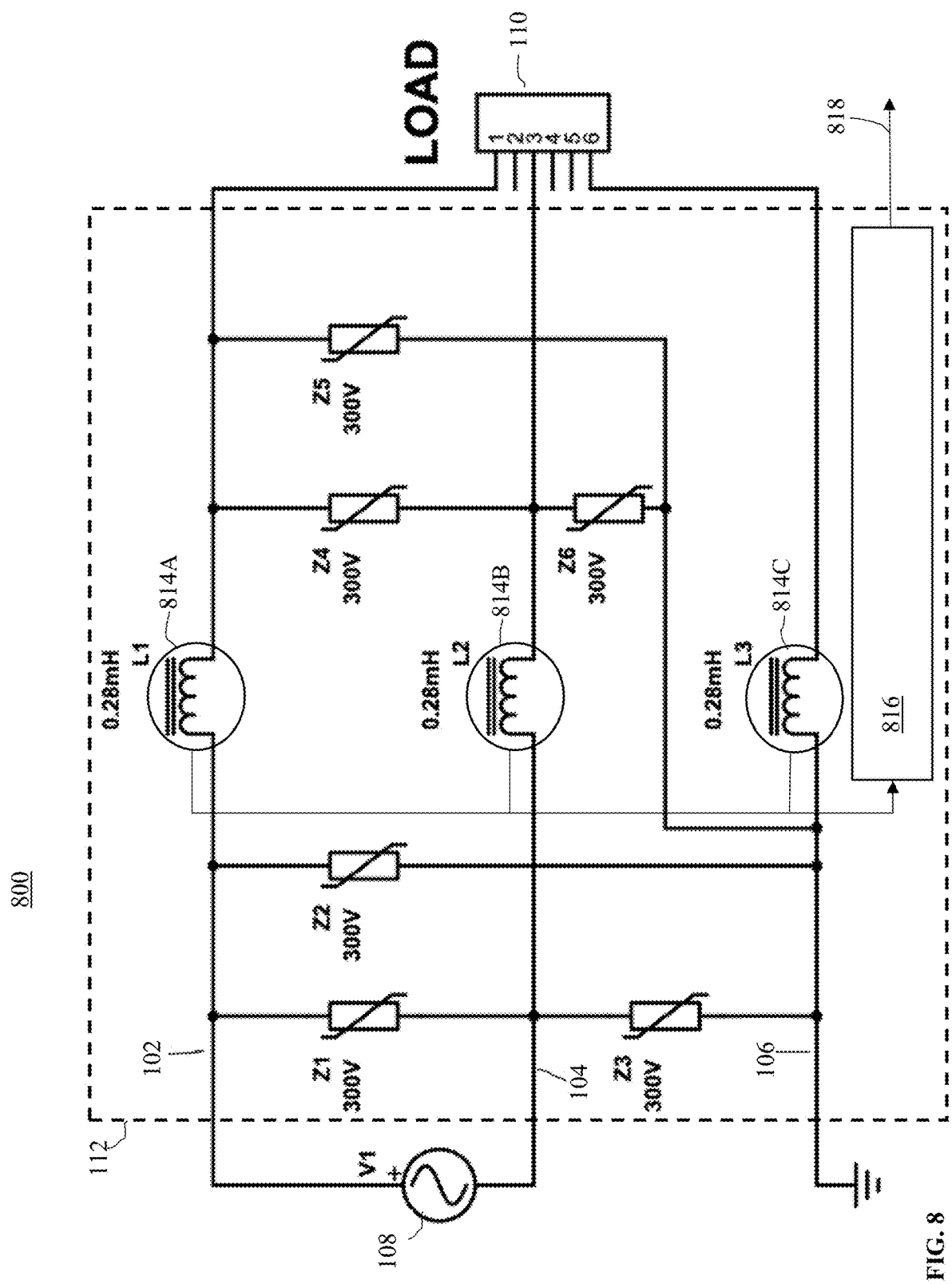
FIG. 8 depicts a system for suppressing data exfiltration over a conductor, as well as detecting/reporting same, according to another embodiment.

FIG. 8 shows depicts a system 800 for suppressing data exfiltration over a conductor, as well as detecting/reporting same, according to another embodiment. The system is similar to the system 100 describe above and shown in FIG. 1. In addition, one or more of the inductors L1, L2 and L3 have been modified to add the secondary/sensing winding 814A-C to each for the purpose sensing power quality components or other signals in the conductors 102, 104, 106, from the signal source 110 as was described above. The secondary/sensing windings 814A-C are coupled, e.g., via leads of which there may be two separate leads (not shown) per sensing winding 814A-C, with a processing component 816 which, as described, is operative to analyze or otherwise process any sensed signals to produce, extract or otherwise derive information therefrom, such as the presence of particular signals, unique device 110 signal signatures/fingerprints or changes thereto, etc. The processing component 816 may include an analog to digital converter for converting the sensed analog signals to digital data indicative thereof, a processor and a memory for storing executable program code for causing the processor to perform the described functions and further for storing data indicative of detected events, device fingerprints, etc. The processing component 816 may further include an interface 818, which may comprise a user interface, such as an external indicator or other annunciator, and/or a communications interface, such as a wired or wireless network interface, for communicating information, such as notifications, reports, data logs, etc. to a recipient, such as a user device, e.g. a mobile device, or a central server for data collection, aggregation and analysis, as well as further dissemination, etc. While the processing component 816 is depicted within the enclosure 112 (suitably adapted to include the additional components) of the device 800, it will be appreciated that one or more portions of the processing component 816 may be located outside of the enclosure 112 and, in one embodiment, remote from the device 800. For example, the device 800 may communicate the sensed analog signals to an external processing component. Alternatively, the device 800 may include an analog to digital converter to convert the sensed analog signals to digital representations thereof which are subsequently communicated, e.g., digitally, to an external processing component 816.

As described above, the architecture of the circuit shown in FIG. 8 may be adjusted for implementation with different electrical supply configurations, e.g., wye, delta, split-phase or single-phase, etc., wherein one or more inductors are implemented, as described, to sense signals, etc.

It will be appreciated that the disclosed system 100 may be implemented as a device, for which multiple such devices are deployed within a given power distribution architecture, each deployed along a particular distribution path servicing one or more electrically powered devices 110. Each of the systems 100 may be interconnected with the other or with a central server, e.g. via a network, to form a detection and protection network for monitoring the entire the power distribution architecture as well as specific portions thereof as described herein. The number, and deployment locations, of the systems 100 being implementation dependent.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above may be altered in various ways. For example, the order of the logic may be rearranged, sub-steps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. An apparatus for suppressing transmission of signals over a conductor coupled between a power source and a signal source powered thereby, the apparatus comprising:
   a first input for receiving power from the power source via one or more power conductors;
   a second input for connecting to a ground conductor;
   an output for providing the received power to the signal source and coupling the signal source with the ground conductor; and
   a circuit coupled with the input and the output, the circuit comprising:
      for each of the one or more power and ground conductors, an inductor forming an electrical path from the first or second input through the inductor to the output; and
   wherein the signals from the signal source impart one or more characteristics on at least the ground conductor, and further wherein at least the inductor associated with the ground conductor further includes a secondary winding operative to sense the one or more characteristics in the conductor included in the electrical path therewith, the secondary winding being coupled with a processor operative to convert the sensed one or more characteristics to digital data representative thereof and process the digital data to derive at least one result therefrom.

2. The apparatus of claim 1, wherein the signal source comprises a computer.

3. The apparatus of claim 1, wherein the signals comprise analog signals imposed on the one or more power and ground conductors by the signal source.

4. The apparatus of claim 3, wherein the analog signals are indicative of digital information processed by the signal source.

5. The apparatus of claim 1, wherein the circuit is further coupled with a power line protection device operative to protect the signal source from surges and/or transient power events.

6. The apparatus of claim 1, wherein the circuit further comprises:
   a first inductor connected in series between a first conductor and a first output line, wherein power supplied by the power source to the first output line flows through the first inductor;
   a second inductor connected in series between a second conductor and a second output line, wherein power supplied by the power source to the second output line flows through the second inductor;

a third inductor connected in series between a ground conductor and a third output line, wherein ground conducted from the signal source to the third output line flows through the third inductor; and wherein an inductance of each of the first inductor, the second inductor and the third inductor increases when power at frequencies greater than the nominal frequency flows through the first second and/or third conductors.

7. The apparatus of claim 6, wherein the circuit further includes, between a connection with the power source and the first and second inductors, a first passive switching device coupled between the first conductor and the second conductor, a second passive switching device coupled between the first conductor and the third conductor and a third passive switching device coupled between the second conductor and the third conductor, and further includes, between the first and second inductors and the signal source, a fourth passive switching device coupled between the first conductor and the second conductor, a fifth passive switching device coupled between the first conductor and the third conductor and a sixth passive switching device coupled between the second conductor and the third conductor.

8. The apparatus of claim 7, wherein the first, second, third, fourth, fifth, and sixth passive switching devices each comprises one of a metal oxide varistor, a Zener diode or gas tube.

9. The apparatus of claim 6, wherein the circuit further includes, between a connection with the power source and the first and second inductors, a first passive switching device coupled between the first conductor and the second conductor, and further includes, between the first and second inductors and the signal source, a second passive switching device coupled between the first conductor and the second conductor.

10. The apparatus of claim 6, wherein the circuit includes no passive switching devices coupled between first, second and third conductors.

11. The apparatus of claim 1, wherein the processor is further operative to communicate the derived at least one result via an interface coupled therewith.

12. The apparatus of claim 1, wherein the derived at least one result comprises an identifier which uniquely identifies the signal source from among other signal sources.

13. The apparatus of claim 1, wherein the derived at least one result comprises an indication that one or more signals are being conveyed from the signal source via at least one of the first, second or third conductors.

14. The apparatus of claim 1, wherein the circuit is operative to convey power received from the power source to a power supply of the signal source and not convey a switched mode power supply imprint and/or signals imposed by CPU transistor switching from the power supply toward the power source or a ground coupled therewith.

15. The apparatus of claim 1, wherein the circuit is further operative to prevent any signals from being induced by the power supply onto a ground coupled with the circuit.

16. The apparatus of claim 1, wherein the circuit is integrated with the power supply.

17. The apparatus of claim 1, wherein the circuit is integrated between the power source and the power supply such that both power supplied by the power supply and the ground path flow through the circuit.

18. The apparatus of claim 1 wherein the circuit is further operative to reform voltage and current waveshapes to a linear profile so that the signal source cannot be uniquely identified from another signal source solely based on the voltage and current waveshapes.

19. The apparatus of claim 1, wherein the circuit is further operative to prevent inductive coupling of magnetic fields generated by the signal source with the conductor.

20. The apparatus of claim 1, wherein the circuit is operative to alter the shape of a fundamental current and voltage waveforms and also alter and diminish any non-fundamental frequency waveforms such that they are not measurable or detectable; and prevent the communication thereof via inductive coupling of any electrical signals on mains current onto the grounding path or vice versa.

21. The apparatus of claim 1, wherein the circuit further comprises:

for at least one pair of conductors of the one or more power and ground conductors, first and second passive switching device coupled therebetween, the first passive switching device being coupled between the input and the inductor, and the second passive switching device coupled between the inductor and the output.

22. The apparatus of claim 1, further comprising an enclosure operative to enclose the circuit and providing one or more electrical connectors for each of the first and second inputs and output.

23. An apparatus for suppressing transmission of signals over a conductor coupled between a power source and a signal source powered thereby, the system comprising:

a first input for receiving power from the power source via one or more power conductors;

a second input for connecting to a ground conductor;

an output for providing the received power to the signal source and coupling the signal source with the ground conductor; and a circuit coupled with the input and the output, the circuit comprising:

means for altering the shape of a fundamental current and voltage waveforms and altering and diminishing any non-fundamental frequency waveforms such that they are not measurable or detectable; and means for preventing the communication thereof via inductive coupling of any electrical signals on mains current onto the grounding path or vice versa; and wherein the electrical signals impart one or more characteristics on the ground conductor, and further wherein the means for preventing further includes a secondary winding operative to sense the one or more characteristics one the ground conductor, the secondary winding being coupled with a processor operative to convert the sensed one or more characteristics to digital data representative thereof and process the digital data to derive at least one result therefrom.

24. A method of suppressing transmission of signals over a conductor coupled between a power source and a signal source powered thereby, the method comprising:

implementing, electrically, a circuit between the power source and the signal source receiving power therefrom, the circuit receiving power from the power source and conveying the received power to the signal source, the implementing further comprising:

coupling a first inductor in series between a first conductor and a first output line, wherein power supplied by the power source to the first output line flows through the first inductor;

coupling a second inductor in series between a second conductor and a second output line, wherein power supplied by the power source to the second output line flows through the second inductor;

coupling a third inductor connected in series between a ground conductor and a third output line, wherein ground conducted from the signal source to the third output line flows through the third inductor; and wherein an inductance of each of the first, second and/or third inductors increases when power at frequencies greater than the nominal frequency flows through the first, second or third conductors respectively; and wherein the signals from the signal source impart one or more characteristics on at least the third conductor, the method further comprising:

providing one or more of the first, second or third inductors with a secondary winding operative to sense the one or more characteristics in the first, second or third conductors respectively, each of the secondary windings being coupled with a processor; and converting, by the processor, the sensed one or more characteristics to digital data representative thereof and processing the digital data to derive at least one result therefrom.

25. The method of claim 24, further comprising conveying power received from the power source to a power supply of the signal source and not conveying a switched mode power supply imprint and/or signals imposed by CPU transistor switching from the power supply toward the power source or a ground coupled therewith.

26. The method of claim 24, further comprising altering the shape of a fundamental current and voltage waveforms and altering and diminishing any non-fundamental frequency waveforms such that they are not measurable or detectable; and preventing the communication thereof via inductive coupling of any electrical signals on mains current onto the grounding path or vice versa.

27. The method of claim 24, further comprising communicating, by the processor, the derived at least one result via an interface coupled therewith.

28. The system of claim 24, wherein the derived at least one result comprises an identifier which uniquely identifies the signal source from among other signal sources.

29. The system of claim 24, wherein the derived at least one result comprises an indication that one or more signals are being conveyed from the signal source via at least one of the first, second or third conductors.

* * * * *